United States Patent
Blosch et al.

(10) Patent No.: US 8,978,704 B2
(45) Date of Patent: Mar. 17, 2015

(54) PULSATION DAMPER OF A VEHICLE BRAKING SYSTEM

(75) Inventors: Georg Blosch, Murr (DE); Harald Hermann, Friolzheim (DE)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 13/994,756

(22) PCT Filed: Oct. 21, 2011

(86) PCT No.: PCT/EP2011/068396
§ 371 (c)(1),
(2), (4) Date: Dec. 24, 2013

(87) PCT Pub. No.: WO2012/079813
PCT Pub. Date: Jun. 21, 2012

(65) Prior Publication Data
US 2014/0116555 A1  May 1, 2014

(30) Foreign Application Priority Data
Dec. 17, 2010  (DE) .......................... 10 2010 063 352

(51) Int. Cl.
*F16L 55/04* (2006.01)
*F15B 1/02* (2006.01)
*B60T 8/40* (2006.01)
*B60T 13/14* (2006.01)
*F15B 1/04* (2006.01)

(52) U.S. Cl.
CPC .............. *F15B 1/021* (2013.01); *B60T 8/4068* (2013.01); *B60T 13/148* (2013.01); *F15B 1/04* (2013.01); *F15B 2201/205* (2013.01); *F15B 2201/3151* (2013.01); *F15B 2201/3153* (2013.01); *F15B 2201/413* (2013.01)
USPC ............................................... 138/30; 138/26

(58) Field of Classification Search
USPC ................................................ 138/30, 31, 26
See application file for complete search history.

(56) References Cited

U.S. PATENT DOCUMENTS

| 3,483,889 | A | | 12/1969 | Bowles | |
|---|---|---|---|---|---|
| 3,853,147 | A | * | 12/1974 | Cibulka | 138/30 |
| 3,868,972 | A | * | 3/1975 | Zirps | 138/30 |
| 4,273,158 | A | * | 6/1981 | Chun | 138/30 |
| 4,408,635 | A | * | 10/1983 | Packer | 138/30 |
| 6,484,756 | B1 | * | 11/2002 | Weber | 138/30 |
| 6,957,669 | B2 | * | 10/2005 | Suzuki et al. | 138/30 |

FOREIGN PATENT DOCUMENTS

| DE | 2 254 032 | 5/1974 |
|---|---|---|
| DE | 103 43 212 A1 | 5/2004 |

(Continued)

OTHER PUBLICATIONS

International Search Report corresponding to PCT Application No. PCT/EP2011/068396, mailed Dec. 29, 2011 (German and English language document) (7 pages).

*Primary Examiner* — Patrick F Brinson
(74) *Attorney, Agent, or Firm* — Maginot, Moore & Beck LLP (57) ABSTRACT

A pulsation damper of a vehicle braking system includes a connection for supplying and discharging fluid into a damper chamber. The connection has a segmented design with a first segment of the connection forming a supply line and a second segment of the connection forming a discharge line. The two segments are delimited from each other by a separating wall.

10 Claims, 5 Drawing Sheets

(56) References Cited

FOREIGN PATENT DOCUMENTS

| | | |
|---|---|---|
| JP | 49-78218 A | 7/1974 |
| JP | 03-502601 A | 1/2003 |
| JP | 2004-108511 A | 4/2004 |
| JP | 2007-519869 A | 7/2007 |
| WO | 00/79135 A1 | 12/2000 |
| WO | 2005/073564 A1 | 8/2005 |

* cited by examiner

PULSATION DAMPER OF A VEHICLE BRAKING SYSTEM

This application is a 35 U.S.C. §371 National Stage Application of PCT/EP2011/068396, filed on Oct. 21, 2011, which claims the benefit of priority to Serial No. DE 10 2010 063 352.6, filed on Dec. 17, 2010 in Germany, the disclosures of which are incorporated herein by reference in their entirety.

BACKGROUND

The disclosure relates to a pulsation damper of a vehicle braking system having a connection for feeding and discharging fluid into a damper chamber.

Pulsation dampers of the aforesaid type are used in hydraulic systems of vehicle braking systems, in order to compensate for pressure fluctuations which occur in the hydraulic system during the operation thereof. Here the pulsation dampers usually form a standard unit, which is connected to a block-shaped hydraulic unit or a hydraulic block of the vehicle braking system. Here the standard unit is normally screwed into the hydraulic unit, wherein a connection connects a damper chamber of the pulsation damper to the hydraulic lines, which are formed in the hydraulic unit.

The connection is intended to create a feed line for feeding fluid, in particular brake fluid, from the hydraulic system into the damper chamber, and a discharge line for discharging the fluid from the damper chamber back into the hydraulic system.

The pulsation dampers are usually designed and screwed into the hydraulic unit so that using a single threaded fitting the feed line and discharge line are created with just one single bore, or the feed line and the discharge line are formed coaxially.

In the solution in which just one single bore is provided as feed line and discharge line, the damper chamber is situated merely in a side path and not in the main flow. There is then no guarantee that the damper chamber will always have a flow passing through it. The consequence may be undamped pressure waves, which can lead to malfunctions in the hydraulic system.

In the solution in which the feed line and the discharge line are coaxial, the feed line is situated inside or in the center of the threaded fitting and is radially externally enclosed by the discharge line. The fluid will thereby be forcibly carried into the damper chamber, and only once it has been stabilized will it be carried back out of this to consumer points. Then, however, the consumer points have to be connected via feed and discharge ducts, first centrally to the feed line and secondly radially outside to the discharge line. These feed and discharge ducts are costly to produce and limit the degrees of freedom in the design of the hydraulic system within the hydraulic unit.

SUMMARY

According to the disclosure a pulsation damper of a vehicle braking system is created, having a connection for feeding and discharging fluid into a damper chamber, in which the connection is of segmented design, wherein a first segment of the connection forms a feed line and a second segment of the connection forms a discharge line, and the two segments are separated from one another by means of a dividing wall.

The solution according to the disclosure creates a connection divided into multiple segments extending in an axial direction, which for carrying fluid are separated from one another by a dividing wall. The dividing wall thereby separates the feed area from the discharge area on the connection, in such a way that the feed and discharge ducts can also both be oriented radially to the connection, making them very cost-effective and easy to produce.

The feed and discharge ducts may be arranged in unidirectional opposition to one another or at an angle other than 180° to one another. Accordingly, large degrees of freedom exist in the design of the connection configuration at the connection of the pulsation damper.

The connection is preferably designed with a tube wall externally enclosing the segments. The tube wall may be formed by a tube, which is inserted into the housing of the pulsation damper and/or of the hydraulic unit.

Alternatively the connection may also be externally formed by a part of the housing of the pulsation damper and/or of the hydraulic unit. The inventive separation of the connection lines for the pulsation damper can then be created by means of a dividing wall, which is introduced as an insert into the bore then formed in the housing of the pulsation damper and/or of the hydraulic unit. The dividing wall preferably bears fluid-tight against the inside wall of the bore. If need be, however, a certain flow behind the dividing wall from the feed line directly into the discharge line can be accepted in this area. However, the essential main flow of the fluid flow should flow through the damper chamber, in order to ensure the necessary damping required.

Furthermore the connection is advantageously designed with more than two segments, of which at least two segments together form the feed line or the discharge line.

Such a development creates an especially large amount of space for the arrangement of the feed duct and the discharge duct in the hydraulic unit, since the two ducts can be connected to the connection largely in any manner desired. The only thing that that matters is that in the cross sectional plane of the connection the two ducts should enclose an angle which is greater than the angle covered by a single segment. This ensures that at least one dividing wall forming the defining wall of a segment, which then separates the two ducts off from one another, is situated between the feed duct and the discharge duct at the connection.

The connection is therefore also advantageously of tubular design having a substantially circular cross section and the individual segment forms a circular segment of this cross section.

Such an insert may be inserted into a bore easily produced in any angular position, which forms the connection area for the feed duct and the discharge duct in the hydraulic unit. According to the disclosure, therefore, the cross section of the inventive connection is sub-divided into two circular segments, in particular two semicircles, if an angle-oriented fitting position is selected, and three or more circular segments if the angular orientation of the fitting position is to be freely selectable.

The individual circular segment in particular preferably covers an angle of 45°, so that a total of eight circular segments, which are separated from one another by means of said dividing walls, come to lie with their circular arcs over the circumference of the associated circular cross-section. Of these circular segments, those circular segments facing the feed duct then form the feed line into the damper chamber, whilst those segments facing the discharge duct return as discharge line out of the damper chamber into the associated hydraulic unit.

The connection according to the disclosure is furthermore preferably provided at one end face with a cover, which serves to cover at least one segment of the connection.

Such a cover allows fluid to flow out of or into the feed or discharge line situated behind the free area of the cover. The other segments, on the other hand, are closed and thereby not accessible. As an alternative to a cover opening, on the inventive connection with its segmental lines at least one opening may also be provided on the circumferential surface of the lines. The end face closed by a cover is preferably that end face which extends into the damper chamber.

The connection is furthermore advantageously provided with a baffle at one end face.

The baffle serves to deflect or divert the flow of fluid at the connection from a radial direction, particularly inside the hydraulic unit, into an axial direction of the connection and its actual lines. The baffle is preferably situated on that end face or that end area of the connection (here, according to the disclosure preferably bar-shaped), which extends into the hydraulic unit.

According to the disclosure the connection is furthermore preferably of tubular design and on its circumferential surface has an opening, which serves to create an inlet or outlet to the inside of the tubular shape.

As explained above, the opening here is formed on the circumferential surface of the housing of the pulsation damper or the hydraulic unit, or is situated in a tube wall, which forms the outer limit such a bar-shaped connection. The opening is particularly advantageous in carrying fluid into or out of various areas over the axial extent of the connection. In this way, therefore, inlets and outlets on the hydraulic unit and on the damper chamber can be formed on different planes, which may be highly advantageous with regard to the degrees of freedom in the ducting, particularly in the hydraulic unit.

In addition the connection is preferably of bar-shaped, in particular tubular design and at one end face it comprises a sealing portion for sealing it off from a base area of a pulsation damper connection bore formed in the associated hydraulic unit.

The sealing portion prevents fluid still inside the hydraulic unit being able to pass from a feed or inlet flow side to the discharge or outlet flow side of the pulsation damper. The sealing portion is preferably created by means of a press-fit. Such a press fit or also a press-fit of the edges of a dividing wall separating the segments off from one another inside a pulsation damper connection bore also serves to ensure that the bar-shaped connection is immovably held, in particular rotationally secured, in the connection bore inside the hydraulic unit.

Finally the connection is made, in particular injection-molded, from plastic.

With a plastic part, in particular an injection-molded part, the aforementioned design configurations of the connection are particularly inexpensive to produce and at the same can be cost-effectively manufactured accurate to size. At the same time a component is created, which is easy to handle when assembling and which remains functionally reliable throughout the service life of the pulsation damper.

BRIEF DESCRIPTION OF THE DRAWINGS

An exemplary embodiment of the solution according to the disclosure is explained in more detail below with reference to the schematic drawings attached, of which.

DETAILED DISCRIPTION

Figure 1:
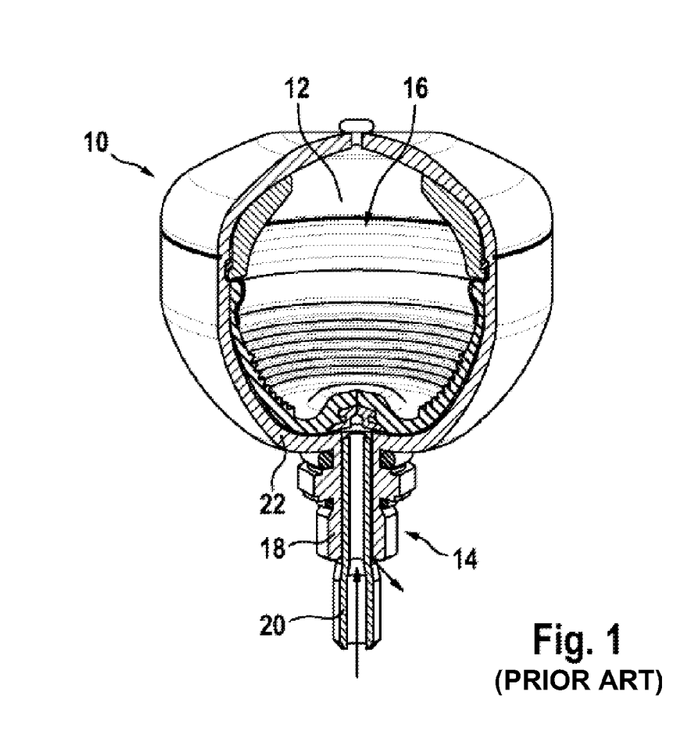
FIG. 1 shows a sectional perspective view of a first example of a pulsation damper having a connection for feeding and discharging fluid according to the state of the art.
Figure 2:
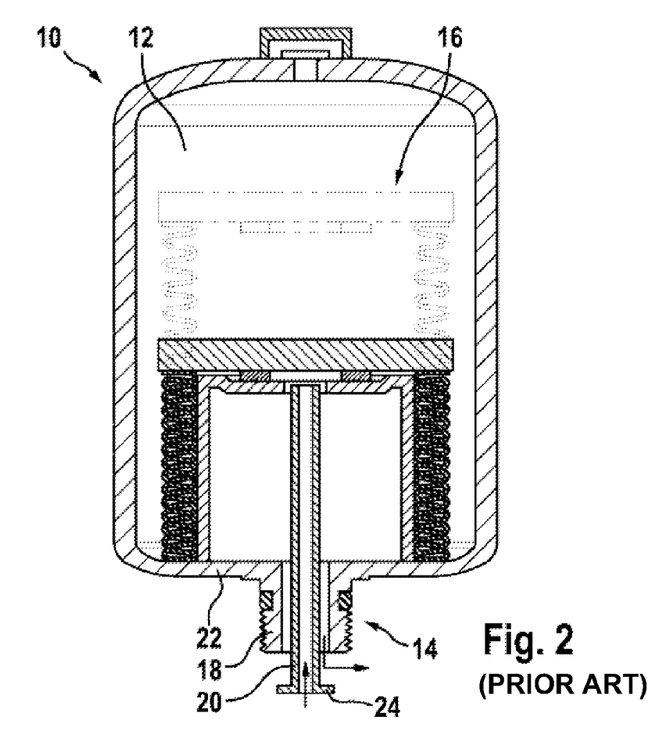
FIG. 2 shows a longitudinal section of a second example of a pulsation damper having a connection according to the state of the art.

FIG. 1 represents a pulsation damper 10 according to the state of the art of a vehicle braking system, not further illustrated. The pulsation damper 10 comprises a substantially spherical damper chamber 12, which by means of a neck-shaped connection 14 has a fluid-carrying connection to a hydraulic unit (not shown). The connection 14 serves for feeding fluid, in this case brake fluid, from the hydraulic unit into the damper chamber 12, and after damping pressure surges or pressure waves there for discharging it back into the hydraulic unit again. Here a diaphragm arrangement 16, which serves for the actual damping, is situated in the damper chamber 12.

In the example in FIG. 1, according to the state of the art the connection 14 is created with an outer tube 18 and an inner tube 20, which are arranged coaxially with one another. The outer tube 18 is created with a part of a housing 22, which encloses the damper chamber 12. Situated inside the tube 18 and coaxial with this is the tube 20, which in this way forms an inner line, which is enclosed by an outer line in the form of an annular duct between the tube 18 and the tube 20.

In this way fluid can flow from the hydraulic unit through the inner tube 20 into the damper chamber 12, and through the outer tube 18 and the annular duct thereby formed back into hydraulic unit.

Here the system of connections to be formed in the hydraulic unit for such a coaxial tube arrangement with the pipes 18 and 20 is relatively difficult to produce, in particular because the coupling points for the tubes 18 and 20 need to be situated at different levels in their axial direction. Furthermore, an annular space, which serves to collect the fluid flowing back out of the tube 18 into the hydraulic unit, has to be formed around the outer end of the tube 18 in the hydraulic unit.

Figure 3:
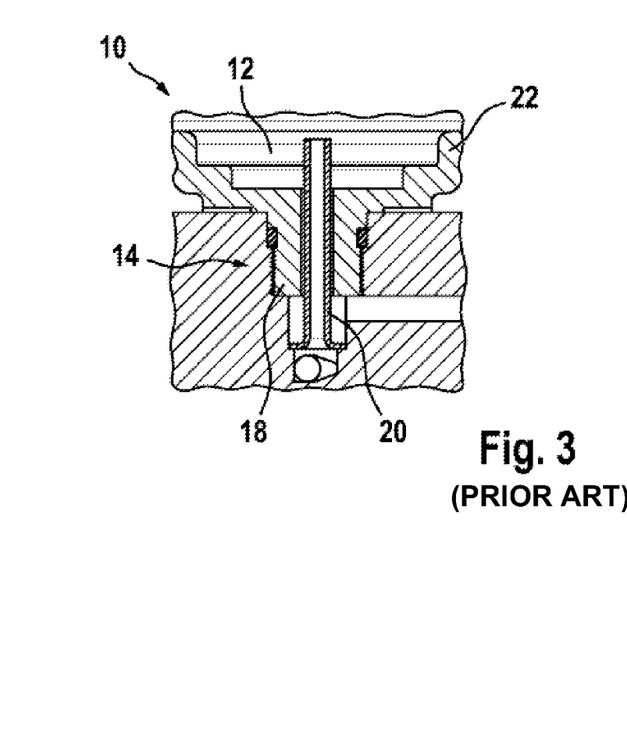
FIG. 3 shows a longitudinal section of a pulsation damper according to FIG. 2 fitted to a hydraulic unit and having a first variant of a connection according to the state of the art.
Figure 4:
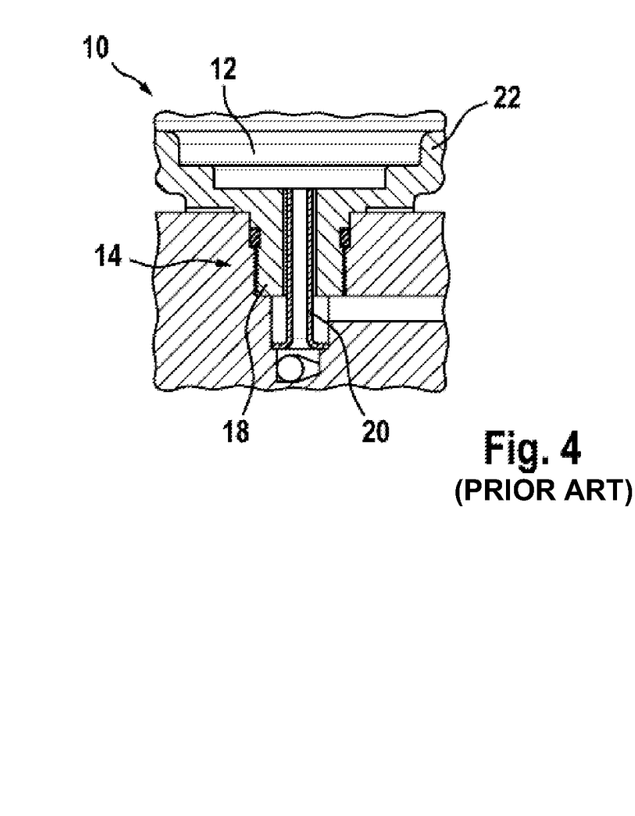
FIG. 4 shows a longitudinal section of a pulsation damper according to FIG. 2 fitted to a hydraulic unit and having a second variant of a connection according to the state of the art.
Figure 5:
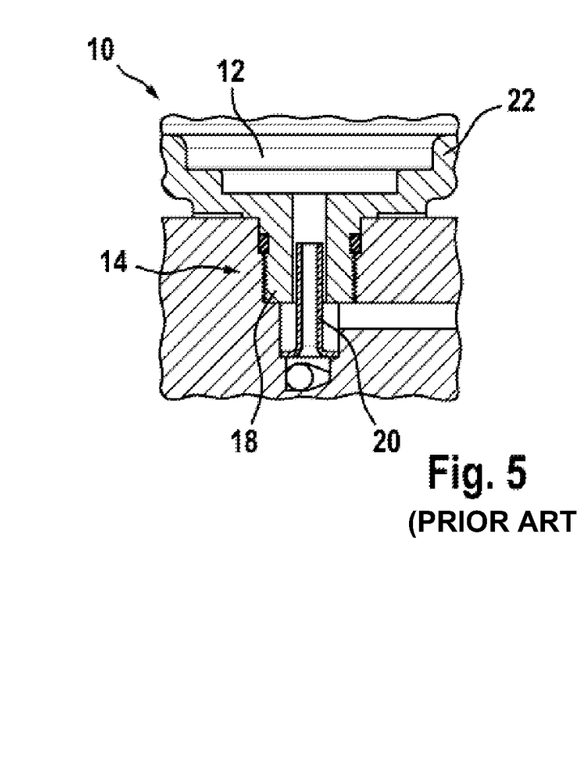
FIG. 5 shows a longitudinal section of a pulsation damper according to FIG. 2 fitted to a hydraulic unit and having a third variant of a connection according to the state of the art.
Figure 6:
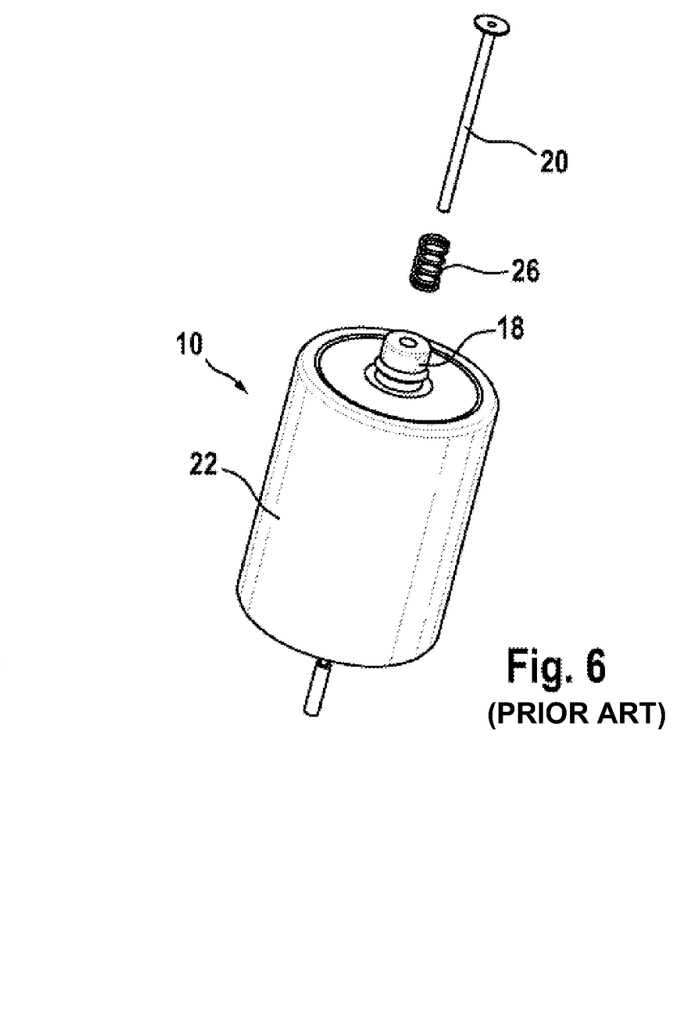
FIG. 6 shows a perspective view of a pulsation damper according to FIG. 2 having an associated connection.

FIGS. 2 to 6 show a similarly functioning example of a pulsation damper, in which two coaxial tubes 18 and 20 are likewise provided as connection 14. In this example according to the state of the art a collar-shaped shoulder 24 or an annular disk is situated at the outer end of the inner tube 20. With this shoulder 24 the tube 20, when fitted, rests inside the hydraulic unit, where it forms a seal. Here, arranged around the outside of the tube 20, between the shoulder 24 and the end face of the tube 18, is a helical spring 26 (see FIG. 6), which serves to press the pipe 20 against the hydraulic unit, in order to form a seal there with its shoulder 24. FIGS. 3 to 5 here show three variants, in which the tube 20 extends to differing degrees into the damper chamber 12. The differing degree to which it extends influences the damping effect inside the damper chamber 12 for that fluid which flows through the damper chamber 12. FIG. 3 shows a variant in which the tube 18 extends very far into the damper chamber 12, so that the fluid has to cover a large distance also inside the damper chamber 12 and accordingly is heavily damped. FIG. 5, on the other hand, shows the other extreme, in which the tube 18 terminates already inside the tube 20. The fluid then does not need to fully enter into the damper chamber 12, but is already able to return inside the tube 20. Accordingly, the damping effect is weakest in this variant. FIG. 4 shows the variant in which the tube 20 terminates at the beginning of the damper chamber 12, so that the damping effect of this variant represents a medium solution.

Figure 7:
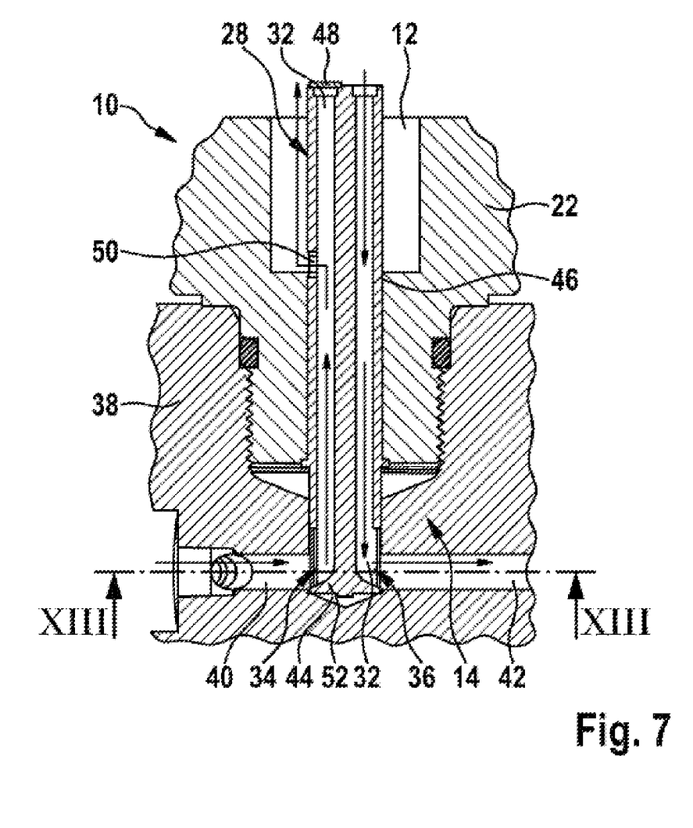
FIG. 7 shows a longitudinal section of an exemplary embodiment of a pulsation damper fitted to a hydraulic unit and having a first variant of a connection according to the disclosure.
Figure 8:
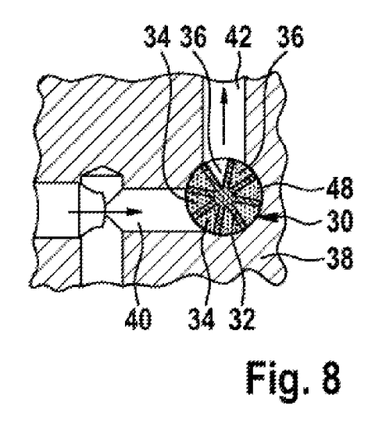
FIG. 8 shows the section VIII-VIII in FIG. 7.

FIGS. 7 and 8 show an exemplary embodiment according to the disclosure, in which the connection 14 is not designed with coaxial tubes 18 and 20, but is segmented in a bar-shape or with a bar 28, which is of segmented design, a total of eight internal circular segments 30 being separated off from one another by means of dividing walls 32. Here a first segment 34 of such a connection 14 forms a feed line and a second segment 36 of the connection forms a discharge line. Such segments 34 and 36 extend in an axial direction of the bar 28 and each individually thereby forms the line, which lead from the hydraulic unit 38 represented in FIG. 7 into the damper chamber 12 and back out of the latter.

Here the dividing walls 32 at the same time separate a feed area having a feed duct 40 in the hydraulic unit 38 from a discharge area having a discharge duct 42, in that the bar 28 extends into the hydraulic unit 38 into an associated blind hole-shaped connection bore 44 externally tightly contiguous with the dividing walls 32. In this way the feed duct 40 and the discharge duct 42 can be connected to the connection bore 44 largely opposite one another, on one level in an axial direction, which in manufacturing the hydraulic unit 38 is especially cost-effective to produce.

The bar 28 is designed with a tube wall 46, which externally encloses the segmental feed lines and discharge lines and which likewise extends into the connection bore 44, but does not reach up to end of the bar 28, so that, as explained above, the bar 28 is open radially outwards at its end area extending into the hydraulic unit 38 and is accessible for the admission and discharge of fluid. At the same time the tube wall 46 is designed so that it extends into the housing 22 of the pulsation damper 10 according to FIG. 4 and radially outwards forms a press fit with the latter.

In the exemplary embodiment of the disclosure according to FIGS. 7 and 8, the discharge duct 42 has a fluid-carrying connection to the connection bore 44, offset at an angle of 90° to the feed duct 40 (see FIG. 8). This means that out of a total of eight circular segments 30 of the bar 28 basically two circular segments (segments 34) act as feed line and two circular segments (segments 36) act as discharge line, whilst no fluid at all flows through the other four circular segments.

The important thing with this arrangement is that the angle of 90°, which the two ducts 40 and 42 enclose, is greater than the angle of 45° (360° divided by eight circular segments) covered by the individual circular segments 30. It is thereby ensured that, between the feed duct 40 and the discharge duct 42 at the connection bore 44, at least one dividing wall 32, which prevents fluid being able to flow directly into the discharge duct 42 without being diverted through the damper chamber 12, is situated between the ducts 40 and 42.

The bar 28 or insert of this type may be inserted into the connection bore 44 in any rotational or angular position desired.

The bar 28 according to FIGS. 7 and 8 is furthermore provided with a cover 48 at that end face which extends into the damper chamber 12. The cover 48 serves to cover seven of the eight circular segments 30, whilst at the same time one circular segment 30 is not covered. Through this open circular segment 30 fluid from the damper chamber 12 can enter into one of the segments 36, so that this acts as discharge line.

In at least one of the segments 34 acting as feed line, on the other hand, an opening 50, which likewise has a fluid-carrying connection to the damper chamber 12, is formed in the circumferential surface or tube wall 46 axially below the bar 28. This opening 50 allows fluid to flow into the damper chamber 12, in such a way that the fluid must first cover a certain distance in the axial direction of the bar 28 before it can reenter the discharge line at the cover 48. Accordingly, this fluid flowing through the damper chamber 12 remains there for a relatively long period and is subjected to a strong damping effect.

The bar 28 is furthermore provided at its end face opposite the cover 48 with a disk-shaped baffle 52. This baffle 52 serves for deflecting or diverting the flow of fluid out of the feed duct 40 into the segments 34 acting as feed line, and as it flows back for deflecting it out of the segments 36 acting as discharge line 36 into the discharge duct 42. As sealing portion, the disk-shaped baffle 52 here bears fluid tight on the base of the connection bore 44, thereby also preventing fluid still inside the hydraulic unit 38 being able to pass from the feed or inlet flow side to the discharge or outlet flow side of the pulsation damper 10. The baffle 52, through a rounded internal transition, furthermore prevents pressure waves inside the feed duct 40 being sharply reflected, instead deflecting them into the damper chamber 12, where they are damped. Such a geometry of the bar 28 is advantageously produced from plastic by means of injection molding.

Figure 9:
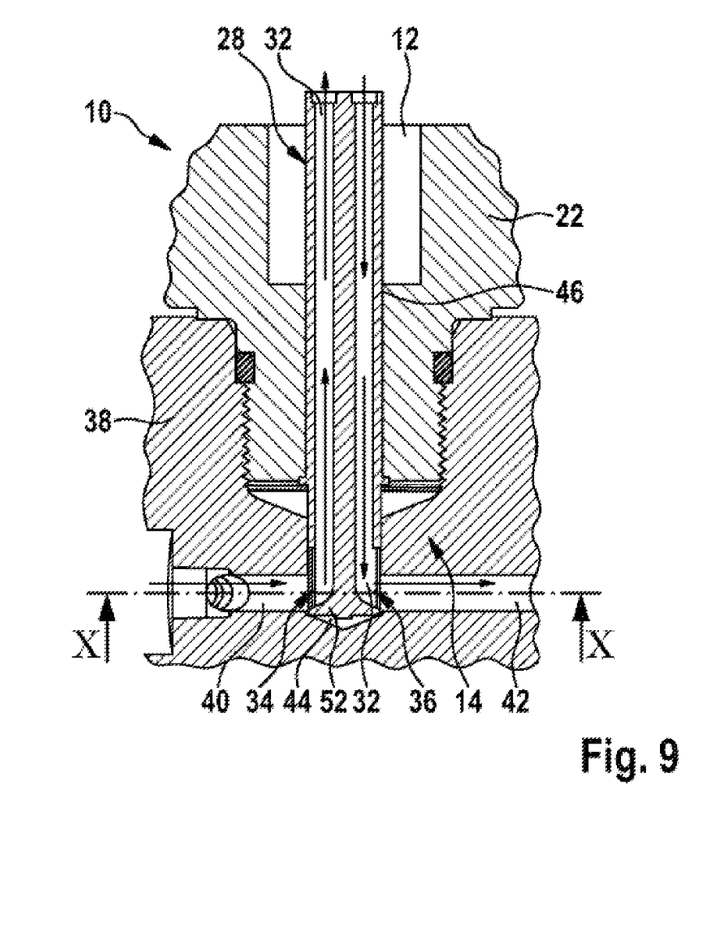
FIG. 9 shows a longitudinal section of an exemplary embodiment of a pulsation damper fitted to a hydraulic unit and having a second variant of a connection according to the disclosure and FIG. 10 shows the section X-X in FIG. 9.
Figure 10:
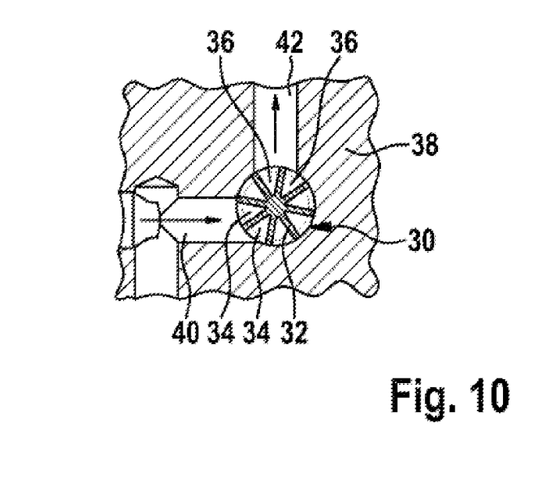

FIGS. 9 and 10 represent an exemplary embodiment of an inventive connection 14 of a pulsation damper 10 on a hydraulic unit 38, in which no cover 48 is provided at the end of the bar 28 extending into the damper chamber 12. Instead, the fluid fed through the segments 34 first at the end face flows into the damper chamber 12 and from there immediately back through the segments 36 again into the discharge duct 42. Accordingly, the period of time which the fluid spends in the pulsation damper 10 is relatively short, resulting in a somewhat different, usually lesser damping effect.

The invention claimed is:

1. A pulsation damper of a vehicle braking system, comprising:
   a housing;
   a connection configured to feed and discharge fluid into a damper chamber formed in the housing,
   wherein the connection is of segmented design with a first segment of the connection forming a feed line and a second segment of the connection forming a discharge line, the first and second segments being separated from each other by a dividing wall; and
   wherein the connection has more than two segments, at least two segments of the more than two segments together form the feed line or the discharge line.

2. The pulsation damper as claimed in claim 1, wherein the connection has a tube wall externally enclosing the segments.

3. The pulsation damper as claimed in claim 1, wherein the connection is of tubular design having a substantially circular cross section, each of the individual segments of the connection forming a circular segment of the cross section.

4. The pulsation damper as claimed in claim 3, wherein each segment covers an angle of 45°.

5. The pulsation damper as claimed in claim 1, wherein the connection at one end face includes a cover configured to cover at least one segment of the connection.

6. The pulsation damper as claimed in claim 1, wherein the connection includes a baffle at one end face.

7. The pulsation damper as claimed in claim 1, wherein the connection is of tubular design and, on its circumferential surface, defines an opening configured to create an inlet or outlet to the inside of the tubular shape.

8. The pulsation damper as claimed in claim 1, wherein the connection is of bar-shaped design and, at one end face, comprises a sealing portion configured to seal the connection off from a base area of a pulsation damper connection bore formed in an associated hydraulic unit.

9. A pulsation damper of a vehicle braking system, comprising:
   a housing;
   a connection configured to feed and discharge fluid into a damper chamber formed in the housing,
   wherein the connection is of segmented design with a first segment of the connection forming a feed line and a second segment of the connection forming a discharge line, the first and second segments being separated from one another by a dividing wall; and
   wherein the connection is made from plastic.

10. The pulsation damper as claimed in claim 9, wherein the connection is injection-molded from plastic.

* * * * *